United States Patent
Divan et al.

(10) Patent No.: US 7,835,128 B2
(45) Date of Patent: Nov. 16, 2010

(54) SYSTEMS AND METHODS FOR DISTRIBUTED SERIES COMPENSATION OF POWER LINES USING PASSIVE DEVICES

(75) Inventors: Deepakraj Malhar Divan, Marietta, GA (US); Harjeet Johal, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 54 days.

(21) Appl. No.: 11/815,052

(22) PCT Filed: Jan. 30, 2006

(86) PCT No.: PCT/US2006/003048
§ 371 (c)(1),
(2), (4) Date: May 2, 2008

(87) PCT Pub. No.: WO2006/083739
PCT Pub. Date: Aug. 10, 2006

(65) Prior Publication Data
US 2008/0310069 A1    Dec. 18, 2008

Related U.S. Application Data (60) Provisional application No. 60/648,466, filed on Jan. 31, 2005.

(51) Int. Cl.
*H02H 9/02* (2006.01)
(52) U.S. Cl. .................................................... 361/93.9
(58) Field of Classification Search ................... 361/93, 361/268, 58; 307/112, 98; 340/870.27
See application file for complete search history.

(56) References Cited

U.S. PATENT DOCUMENTS

| | | | |
|---|---|---|---|
| 5,032,738 A * | 7/1991 | Vithayathil | 307/112 |
| 5,063,303 A | 11/1991 | Sackman et al. | |
| 6,456,097 B1 | 9/2002 | Sutherland | |
| 6,744,613 B2 | 6/2004 | McCook et al. | |
| 7,105,952 B2 * | 9/2006 | Divan et al. | 307/98 |
| 7,518,529 B2 * | 4/2009 | O'Sullivan et al. | 340/870.27 |
| 2003/0222747 A1 * | 12/2003 | Perkinson et al. | 336/178 |
| 2005/0073200 A1 * | 4/2005 | Divan et al. | 307/44 |

OTHER PUBLICATIONS

International Search Report and Written Opinion.

* cited by examiner

*Primary Examiner*—Stephen W Jackson
*Assistant Examiner*—Angela Brooks
(74) *Attorney, Agent, or Firm*—Thomas, Kayden, Horstemeyer & Risley, LLP (57) ABSTRACT

Systems and methods for implementing line overload control via providing distributed series impedance are disclosed. One system, amongst others, comprises at least one distributed series reactor (DSR). Each DSR comprises a single turn transformer (SST) comprising two split-core sections (132), a winding (120), and an air-gap (138), the air-gap designed such that a magnetizing inductance is produced when the two split-core sections (132) are clamped around a conductor (108). Each DSR further comprises a contact switch (122) that short circuits the winding when the contact switch (122) is in a closed condition, a power supply (128) that derives power from conductor line current, and a controller (130) configured to open the contact switch when the conductor line current reaches a predetermined value, thus causing insertion of the magnetizing inductance into the conductor. The controller (130) may be further configured to close the contact switch (122) when the conductor line current drops below the predetermined value.

35 Claims, 7 Drawing Sheets

SYSTEMS AND METHODS FOR DISTRIBUTED SERIES COMPENSATION OF POWER LINES USING PASSIVE DEVICES

CROSS-REFERENCE TO RELATED APPLICATION

This application claims priority to copending U.S. provisional application entitled, "Systems and Methods for Determining Power System Transmission Line Information", having Ser. No. 60/648,466 filed Jan. 31, 2005, which is entirely incorporated herein by reference.

TECHNICAL FIELD

The present disclosure is generally related to controlling power flow in a transmission grid and, more particularly, to inserting distributed series impedance into power transmission lines to reduce the current flow in the targeted lines.

BACKGROUND OF THE INVENTION

Of the challenges facing utilities, a major issue is the elimination of transmission constraints and bottlenecks. A significant issue in terms of grid utilization is active power flow control. Electric utility customers purchase real power, megawatts and MW-Hrs, as opposed to voltage or reactive power. Thus, control of how and where real power flows on the network is of critical importance. Congested networks limit system reliability and constrain the ability of low cost generators to provide interested customers with low-cost power. The situation is considerably aggravated when one sees that neighboring power lines are operating below capacity, but cannot be utilized, while uncontrolled 'loop-flows' result in overloads on existing lines. Active power flow control requires cost-effective 'series VAR' solutions that can alter the impedance of the power lines or change the angle of the voltage applied across the line, thus controlling power flow. Series reactive compensation has rarely been used other than on long transmission lines, mainly because of high costs and complexity of achieving voltage isolation and issues related to fault management.

There is general consensus that future power grids will need to be smart and aware, fault tolerant and self-healing, dynamically and statically controllable, and asset and energy efficient. The accepted and technically proven approach for realizing a smart grid, in particular achieving control of active power flow on the grid, has been through the use of Flexible AC Transmission Systems, or FACTS. Typical FACTS devices can operate at up to 345 kV and can be rated as high as 200 MVA. Even though FACTS technology is technically proven, it has not seen widespread commercial acceptance due to a number of reasons: 1) High system power ratings require the use of custom high power GTO or GCT devices with significant engineering effort—raises first cost; 2) High fault currents (60,000 Amps) and basic insulation requirements (1000 kV) stress the power electronic system, especially for series systems that are required for power flow control; 3) Utilities require higher reliability levels than what they have so far experienced with FACTS devices; 4) Required skilled work force in the field to maintain and operate the system is not within a utility's core competency normally; 5) High total cost of ownership, e.g., the Marcy convertible static compensator (CSC) cost $54 million.

The use of clamp-on transformers to realize 'floating' power couplers is well known. The technique has been proposed for coupling power from an insulated cable for underwater power transfer, and for contactless power transfer to mining equipment. The use of power line instrumentation that is floating on the power lines, and draws power from the line itself is also well known and has long been in commercial use. The use of floating couplers to realize power line communication, including broadband over power line (BPL) is also well known. The use of series coupled transformers to inject quadrature voltage into the line, as in a SSSC, UPFC or active filter is also well known.

Distributed series passive impedance use has been proposed by Hydro-Quebec, inserting switchable series capacitors on long transmission lines to change line impedance. The switches are generally controlled from a central controller. However, the line is specially built for desired impedance at significant cost and reduced flexibility. The desired impedance cannot be easily be attached to an existing line, and cannot be redeployed at a later date. Further, the capacitances can only decrease line impedance, and are primarily used to reduce the impedance of long-haul transmission lines.

The use of distributed series 'active' impedance modules has been proposed in U.S. patent application entitled "Distributed Floating Series Active Impedances For Power Transmission Systems," having Ser. No. 10/678,966 and filed on Oct. 3, 2003, which is incorporated herein by reference in its entirety. The application proposes the use of power electronics inverters distributed along the line, to be used collectively to inject a quadrature voltage into the line to control current flow. The proposed technique requires a high bandwidth communications infrastructure that is used to command the impedance required from individual modules. The command is to be generated by a network level controller that has visibility to the current in all power lines, and can compute the optimal value for individual line impedances. This command is then communicated to individual modules for execution.

The complexity of the above-described mode of operation adds significant cost and complexity to the power transmission system. The cost of the power converters themselves, especially when designed to operate under the harsh environmental conditions encountered on a power transmission line, is likely to be a limiting factor. Further, the operation of power electronics converters for long periods of time (target 30 years) when suspended on a power transmission line and subject to harsh environmental conditions, will create reliability and availability problems for utilities deploying such technology. These issues point to the need for an alternative approach that has lower cost, is simpler, and is not predicated on the availability of a high bandwidth communications infrastructure.

There exists then a need for a distributed approach realizing passive devices, in particular series passive devices for distributed series impedance.

SUMMARY OF THE INVENTION

Briefly described are systems and methods for implementing line overload control via inserting distributed series impedance into transmission line conductors. One exemplary system, among others, comprises at least one distributed series reactor (DSR), the at least one DSR comprising a single turn transformer clamped around a conductor, and a controller configured to insert magnetizing inductance into the conductor when conductor line current reaches a predetermined value. The controller may be further configured to remove the magnetizing inductance when the conductor line current returns below the predetermined value.

One exemplary method, among others, comprises implementing overload control by providing a magnetizing inductance via a distributed series reactor, and causing the magnetizing inductance to be inserted into a conductor when the conductor line current reaches a predetermined value. The method may further provide for removing the magnetizing inductance when the conductor line current drops below the predetermined value.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
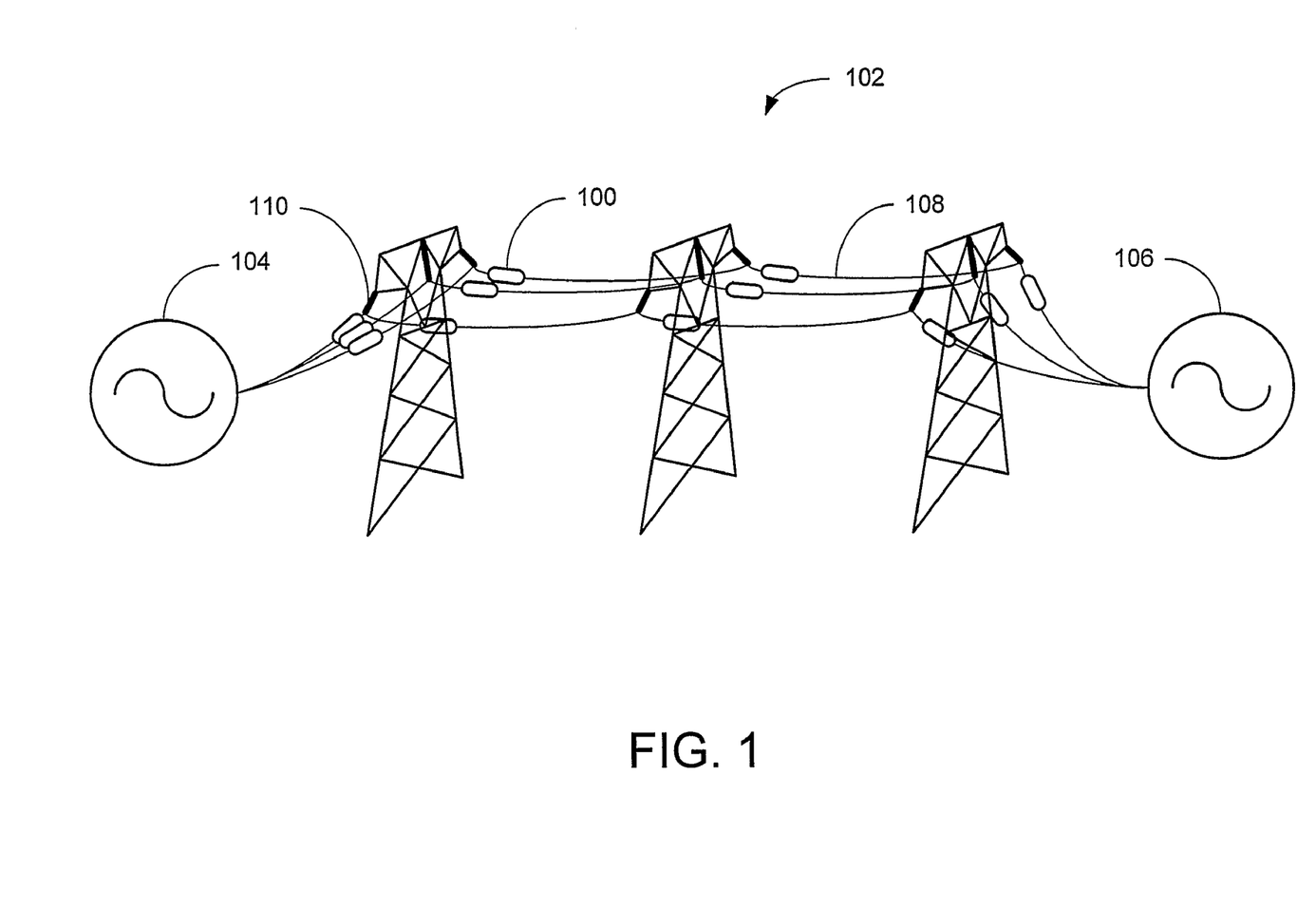
FIG. 1 shows an embodiment of a distributed series reactor in an electric power system.

FIG. 1 illustrates an embodiment of a distributed series reactor (DSR), denoted by reference numeral 100, for line overload control by insertion of a distributed series impedance into a conductor 108 of an electric power system 102. The electric power system 102 has an electric power source 104 and a load 106 connected by at least one, and usually multiple, conductors 108. Of course, the electric power system 102 may have multiple power sources 104 and multiple loads 106. The DSR 100 is attached to a transmission line conductor 108 preferably, but not necessarily, near to an insulator 110. As discussed further below, the DSR 100 modules are formed to attach to the conductor 108 without requiring a break or any other physical modification to the power line.

Further, the DSR 100 operates without the necessity of information regarding currents flowing in the rest of the network, without a central controller, and without a communication infrastructure that is normally required for proper system operation.

The first power transmission line in an interconnected network that reaches a thermal limit constrains the power transfer capacity of the entire network, even though all other lines, at that time, may be operating significantly below their thermal limit. Under such conditions, if the impedance could be increased for the line approaching thermal limit, current would flow into other lines that have not yet reached their thermal limit. This would essentially increase the amount of current flowing in the network without causing an overload on any one line. Thus, line impedance can be controlled based on local parameters alone, i.e. the current in the power transmission line, and does not require information from any other lines in the network.

Implementation of such overload control requires only an increase in the impedance of the line beyond its nominal value. As line current approaches its thermal limit value, the impedance of the line increases, causing a redistribution of the current in the network such that under-loaded lines will be forced to carry additional levels of current than they would normally carry.

Further, to achieve distributed series impedance it is not necessary to vary the impedance of each module over the entire range. Rather, each module can switch between a limited number of distinct values, and the switching of all the modules can be coordinated using apriori set points so as to realize line impedance variation over a desired range.

The DSR 100 allows a passive, switchable distributed inductance to be gradually inserted into a conductor 108, thus effectively increasing the line impedance and causing current to direct into other lines that have additional capacity. A distributed series impedance device such as the DSR 100 may be clamped around the conductor 108 using a single turn transformer (STT). As discussed further below, the STT has an air-gap designed to insert a desired magnetizing inductance into the conductor 108. The power and control circuits are simplified, thus reducing weight, cost and reliability of the DSR 100. The use of mainly passive components results in improved design for harsh environments, extreme temperatures and electrical overloads under fault conditions. The use of redundant DSR 100 modules improves system reliability. Monitoring line inductance as a function of line current also makes it possible to identify the location of a failed DSR 100 module.

Figure 2:
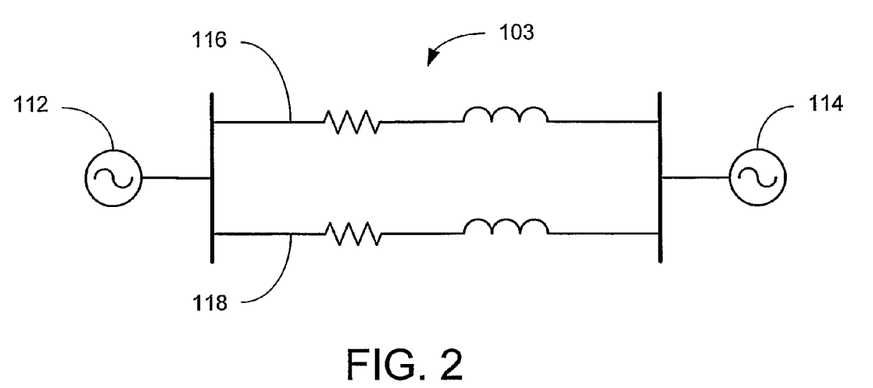
FIG. 2 shows a simple power system with two transmission lines by way of illustration.

FIG. 2 illustrates an example of a power system having two transmission lines. The first line 116 is 20 miles long and has an impedance of 3.4+j16 ohms and a current of 170 Amperes. The second line 118 is 30 miles long and has impedance of 5.1+j24 ohms and a current of 513.5 Amperes. The power source 112 has a voltage of 138∠0° kV. The load 114 is at a voltage of 138∠9.07° kV. Line 116 reaches thermal limit before line 118 does. At that point no more power can be transferred without overloading line 116, even though line 118 has additional unutilized capacity.

For controlling power flow on transmission lines, the series elements have the highest potential and impact. The real and reactive power flow, P and Q, along the transmission line connecting two voltage buses is governed by the two voltage magnitudes $V_1$ and $V_2$ and the voltage phase angle difference $\delta = \delta_1 - \delta_2$.

$$P_{12} = \frac{V_1 V_2 \sin\delta}{X_L} \qquad \text{Equation (1)}$$

$$Q_{12} = \frac{V_1^2 - V_1 V_2 \cos\delta}{X_L} \qquad \text{Equation (2)}$$

where $X_L$ is the impedance of the line, assumed to be purely inductive.

Control of real power flow on the line thus involves changing the angle δ, or the line impedance $X_L$. Of course, reactive power flow is also affected by the changing line impedance. A phase shifting transformer can be used to control the angle δ. This is an expensive solution and does not allow dynamic control capability. Alternatively, a series compensator can be used to increase or decrease the effective reactive impedance $X_L$ of the line, thus allowing control of real power flow between the two buses. The impedance change can be effected by series injection of a passive capacitive or inductive element into the line. Alternatively, a static inverter can be used to realize a controllable active loss-less element such as a negative or positive inductor or a synchronous fundamental voltage that is orthogonal to the line current.

Referring again to FIG. 2, transmission and sub-transmission systems tend to be increasingly meshed and interconnected. The ability to switch out faulted lines without impacting service has a dramatic impact on system reliability. However, in such interconnected systems, current flow is determined by line impedances, and the system operator has very limited ability to control where the currents flow in the network. In such systems, the first line to reach thermal capacity limits the capacity of the entire network, even as other lines remain considerably under-utilized. For example, if series reactive compensation were applied to the two line system 100 in FIG. 2, additional current could flow in line 118 and an additional 52 MW of power could be transferred between the two buses by changing the line reactances by 20 percent, as is shown in TABLE A.

TABLE A

Increase in Power Transfer by Change of Line Reactance

| Line Reactance (Ω) | Line Currents (A) | Load Angle (deg.) | Line Power (MW) | Transferred Power (MW) |
|---|---|---|---|---|
| $X_{116}$ = 16 | $I_{116}$ = 770 | δ = 9.07° | $P_{116}$ = 176.5 | 294.2 |
| $X_{118}$ = 24 | $I_{118}$ = 513.5 | | $P_{118}$ = 117.7 | |
| $X_{116}$ = 19.2 | $I_{116}$ = 770 | δ = 10.81° | $P_{116}$ = 177 | 346.4 |
| $X_{118}$ = 19.2 | $I_{118}$ = 756 | | $P_{118}$ = 169.4 | |

Series FACTS devices can control power flow by varying the parameters in equation (1). Such devices typically require a break in the line and a high voltage platform, further adding to the cost and complexity. Distributed series impedance utilizing passive devices offers the promise of a cost-effective, scalable and controllable series impedance device that can be incrementally deployed, and also features high reliability and availability.

Typical transmission line impedance $X_L$ is approximately 0.79 ohms/mile. At the line thermal capacity of 770 Amperes corresponding to 184 MVA of power flow, the voltage drop across the line impedance is thus 608 volts/mile. A two percent change in line impedance would thus require injection of 12.16 volts or 0.0158 ohms/mile. This translates into an impedance value of 42 μH or 9.24 kVAR (12 volts at 770 Amperes). This is a surprisingly small impedance value to have a significant impact on the power line capacity and could be accomplished with one single 9.24 kVAR module deployed per mile of the line. Such a module could be small and light enough to be suspended from the power line, floating both electrically and mechanically on the line itself. This also raises the possibility of implementing a distributed series impedance using a large number of such modules that can be clamped around an existing power line conductor.

The series injection of impedance or voltage at each module can be accomplished using a single turn transformer (STT) that uses the line conductor itself as a winding of the transformer. By floating the device on the wire, all issues of voltage rating and insulation are avoided.

The redundancy provides for uninterrupted operation in the event of a unit failure, giving higher reliability and availability. The STT allows handling of high levels of fault current, typically a challenging problem for series connected devices. The target power rating of approximately 9.2 kVA allows the use of readily-available high-volume low-cost components and manufacturing technologies to realize very low unit module cost. The devices can be incrementally deployed as needed, providing an increased level of scalability. Finally, the device can be clamped onto an existing power line, simplifying the installation and commissioning process.

Figure 3:
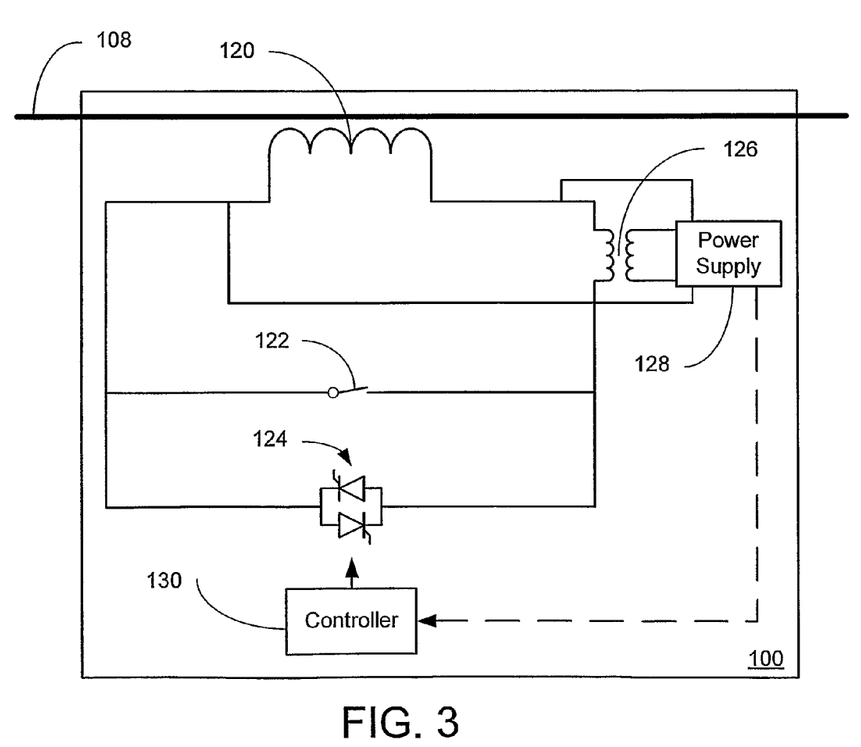
FIG. 3 is a functional schematic of a distributed series reactor for use in the power system of FIG. 2.

FIG. 3 shows an embodiment of a distributed series reactor (DSR), denoted by reference numeral 100, for line overload control via inserting a distributed series impedance into a conductor. One or more DSR 100 devices can be deployed, though preferably at least two DSR 100 devices will be deployed in interconnected or meshed power networks. The DSR 100 devices can be autonomously controlled at the individual module level, using a simple control strategy with no communications, thus dramatically increasing the capacity of the overall power grid.

The DSR 100 comprises an STT 120, a clamp-on transformer power coupler with a switch, that clamps around the transmission line or conductor 108. In a preferred implementation, the STT 120 in its clamped position has a designed air gap such that the magnetizing inductance is substantially equal to the desired insertion inductance. The STT 120 winding is shorted using a normally closed contact switch 122. It should be evident that the contact switch could be, for example, an electromechanical switch. The contact switch 122 bypasses the module when it is not energized. A small power supply 128 derives power from the line current via a current transformer 126. The power supply 128 provides power to the controller 130. The controller 130 monitors the line current and opens the contact switch 122 when the line current reaches a predetermined level. With the contact switch 122 open, a thyristor 124 controls insertion of the series reactance. With thyristor 124 closed a minimum level of reactance corresponding to the STT 120 leakage reactance is inserted into the conductor 108. With thyristor 124 open, the STT magnetizing inductance tuned to the desired value by setting the air gap, is inserted into the line. Those of skill in the art will recognize that the thyristor 124 is not critical to the design. If the thyristor 124 is omitted, then opening the contact switch 122 will insert the magnetizing inductance into the conductor 108.

The closed switch 122 shorts the transformer winding, inserting virtually zero inductance into the line or conductor 108. When the switch 122 is open, the magnetizing inductance is inserted into the conductor 108, and a distributed series reactance is implemented. Multiple DSR 100 modules switching at predetermined and different levels can then be used to realize the range of power line impedance control required, thus implementing a power line overload control system. The electric power system 102 operates without the necessity of a communication infrastructure and realizes reduced cost and increased reliability with the DSR 100 module implementation.

At a system level, as the current in a particular line exceeds a predetermined value, increasing numbers of DSR 100 modules are switched in, gradually increasing line impedance and diverting current to under-utilized lines. As the overall control objective is to keep lines from thermal overload, the control strategy is seen to be very simple. The control algorithm for DSR 100 modular operation is defined in equation (3).

$$L_{inj} = L_f \frac{(I - I_0)}{(I_{Thermal} - I_0)}$$ Equation (3)

where $L_{inj}$ is the injected line inductance, $L_f$ is the final value of inductance with all the DSR modules on the line active, $I_0$ is the triggering value of current for a module, $I_{thermal}$ is the thermal limit beyond which there is no injection.

Figure 4:
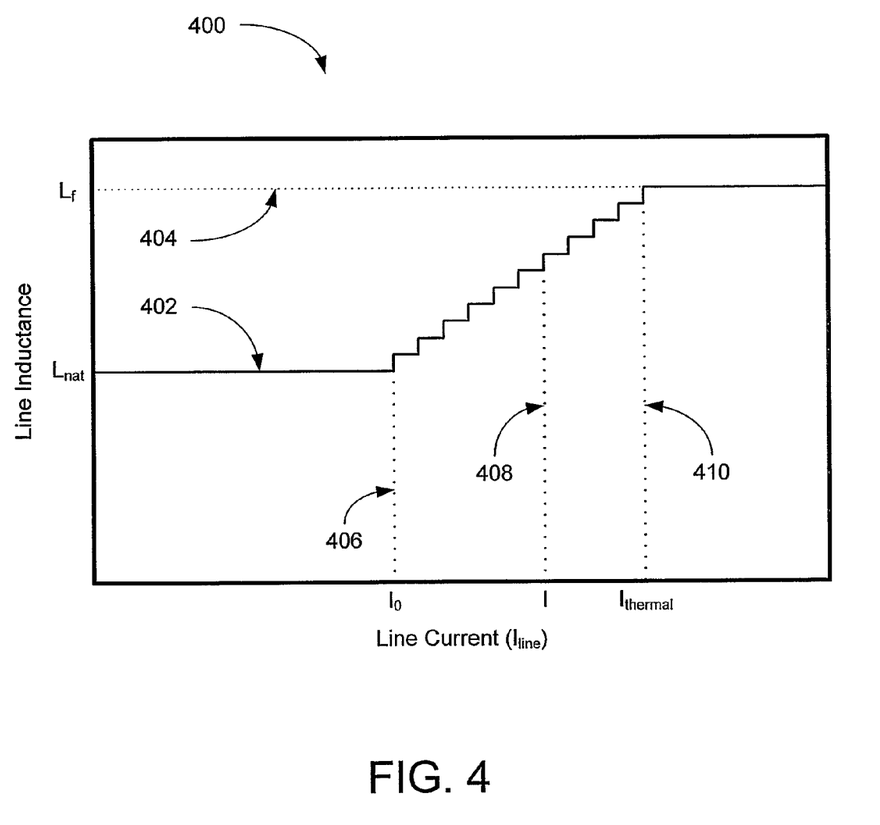
FIG. 4 is graph illustrating the increase in line inductance as distributed series reactors according to FIG. 3 switch in due to increase in line current.

Different modules on a line have predetermined switching levels (based on line current) that collectively provide a line inductance that increases as the line current increases above a defined threshold, as illustrated in FIG. 4. FIG. 4 shows a graph 400 illustrating the increase in line inductance above $L_{nat}$ 402 as the line current increases. For example, when the line current reaches a certain level, $I_0$ 406, then the first DSR 100 will activate to insert a desired level of reactance into the transmission line above the initial $L_{nat}$ 402. The increased reactance will cause some current to be diverted into alternative transmission lines. As the line current I, denoted by reference numeral 408, continues to increase, a next level of activation is reached, thus causing the next DSR 100 to activate and insert an additional desired level of reactance into the transmission line. The increased reactance will cause additional current to be diverted into alternate transmission lines. The insertion of distributed series impedance will continue as necessary as long as the line current increases causing additional DSR 100 modules to activate. When all DSR modules on the line are activated, the inductance reaches its final value, $L_f$ 404. The final value of $L_f$ 404 can be set according to the thermal limit of the conductor, and thus of the current, $I_{thermal}$ 410, beyond which no injection of inductance will occur.

Pre-selected lines that are likely to see overload conditions at certain times of the day or under defined contingency conditions can be modified with DSR 100 modules to automatically handle the congestion when it occurs, and to minimally impact the system under normal operating conditions. Deployment of DSR 100 modules on a power line can thus help to realize the concept of a current limiting conductor.

Control of DSR 100 modules, when implemented on multiple lines, infers that no oscillations or interactions occur. An exponentially decaying estimator, as shown in equation (4), is used within each module to minimize interactions between modules and lines.

$$L_{exp} = (L_{inj} - L_{prev})(1 - \exp^{-t(t-t0)}) + L_{prev}$$ Equation (4)

valid over to $t_0 \leq t \leq t_0 + \Delta t$.

$L_{exp}$ corresponds to actual injection demand at every sampling instant.

Having many DSR 100 modules on the transmission lines of a power grid with all DSR 100 modules set to activate at specific current levels creates a very gradual rate of change of impedance. This effectively creates what appears as a linear change in impedance as far as the system is concerned and does not require communication between the devices. Each DSR 100 is programmed to turn on and off at slightly different levels. It should be emphasized also that when the current drops back below the predetermined level, then the thyristor allows the added reactance to be removed from the line and the system returns to its normal state of operation. It should be emphasized that the system is self-regulating and that the line reverts back to its original condition when the thermal overload conditions are no longer present. It should be further emphasized that while communication is not necessary for the operation of the DSR 100, communications can be used to improve performance. Control is based on parameters local to the DSR 100. Multiple units are controlled in sequence to create a continuum in terms of impedance parameters.

As an example, with one hundred DSR 100 modules deployed, it is possible to change line inductance with one percent resolution. The switching of the DSR 100 modules would need to incorporate noise filtering, hysteresis, and other protection mechanisms as is well known to those skilled in the art. However, it is still evident that no communication is required for the operation of the DSR 100.

The DSR 100 module may be understood as a current limiting cable. As the current in the cable approaches its thermal capacity, it increases the impedance thus forcing current to flow into other relatively unloaded parts of the network. This occurs in a predictable manner and allows system operators to better utilize the system available transmission capacity.

Figure 5A:
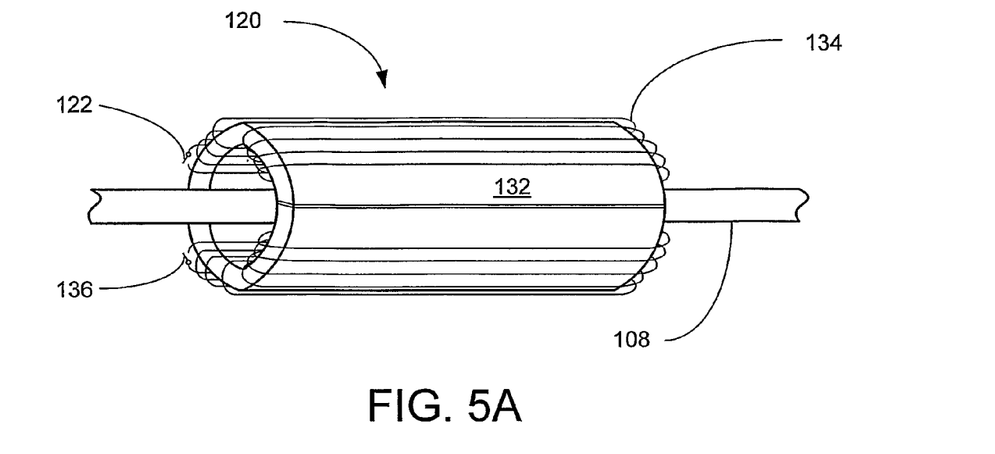
FIG. 5A shows a side view of the distributed series reactor according to FIG. 3.

FIG. 5A emphasizes the STT 120 portion of a DSR 100. The STT 120 is clamped around a conductor 108 and includes two split core sections 132, a winding 134 and a normally closed contact switch 122. The split core sections 132 are the portion of the STT 120 that are clamped around the conductor 108. Additionally, a second contact switch 136 may be used if it is desired to utilize separate windings 134 on each of the two split core sections 132. It should be noted that the contact switches could be, for example, electromechanical switches.

Figure 5B:
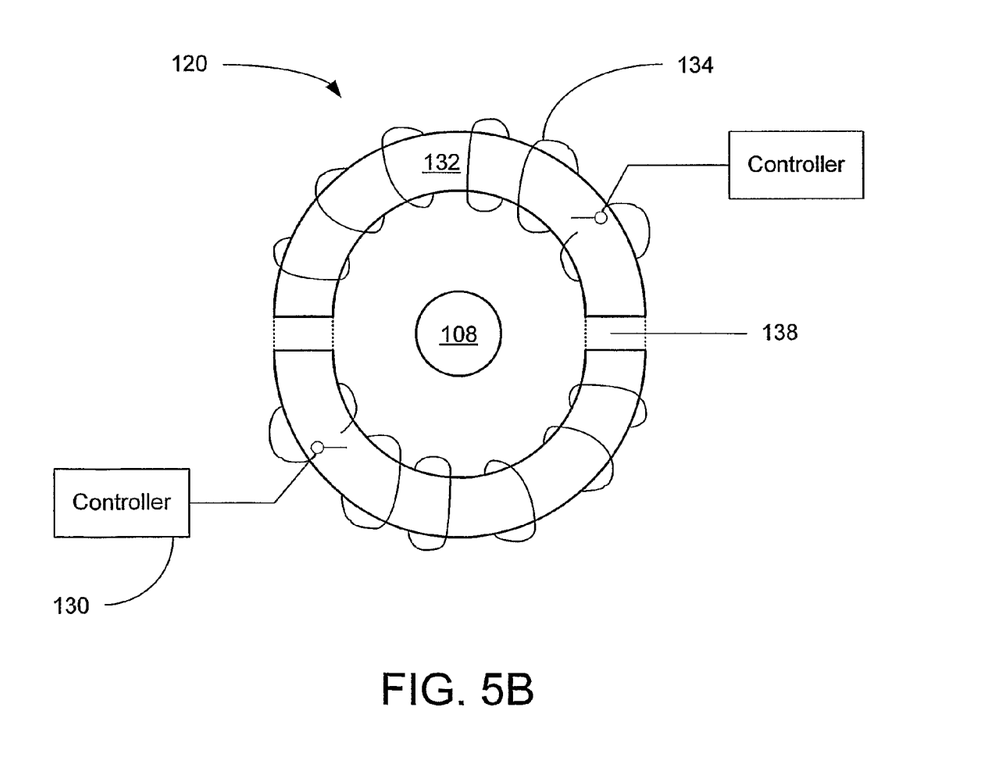
FIG. 5B shows an end view of the distributed series reactor according to FIG. 3.

FIG. 5B illustrates a view from one end of the ST 120 portion of the DSR 100. The controller 130 operates the contact switch 122. The controller closes the contact switch 122 to short the windings 134, thus bypassing the DSR 100. The controller 130 opens the contact switch 122 to utilize the DSR 100. The air gap 138 is designed such that the DSR 100 will produce the desired inductance when the controller 130 places the magnetizing inductance into the conductor 350.

With contact switch 122 and thyristor 124 open, the magnetizing inductance is inserted into the cable. The air gap 138 is designed such that the correct level of inductance is inserted. This simplifies the construction of the clamp-on device thus reducing the cost. It may be desirable to use two identical halves that are coupled together to realize a complete transformer. Alternatively, all the windings can be on one segment of the core with a single core segment utilized to complete the magnetic circuit. In this instance, there would be only one contact switch 122.

It should be emphasized that DSR 100, in its preferred embodiment, is a completely passive switchable system for line overload control via inserting distributed series inductance into a conductor 108. The DSR 100 operates, in its preferred embodiment, with no communications and simplified system interface requirements. While power semiconductor could be utilized to perform the switching function, the electromechanical contractor, contact switch 122, is preferable. As noted previously, the use of mainly passive components improves design for harsh environments, extreme temperatures and electrical overloads under fault conditions. The system can be used to target lines that are in danger of overload under certain power system conditions. The system can effectively increase the line impedance and cause current to divert to lines having additional capacity. The targeted lines could be prevented from overloading, and additionally transmission loading relief calls and line trips can be avoided.

Again, it should be emphasized that no outside communications are necessary for operation of the DSR 100. It should understood by those of skill in the art, that communications could, however, be utilized to allow a system operator greater programming capability of the controller 130. The DSR 100 could be allowed to communicate with other DSR 100 modules. Further, the system operator could reprogram one or more controllers 130 via communication links (not shown). Additionally, the controllers 130 could be reprogrammed via a short-range remote control, for example.

Figure 6:
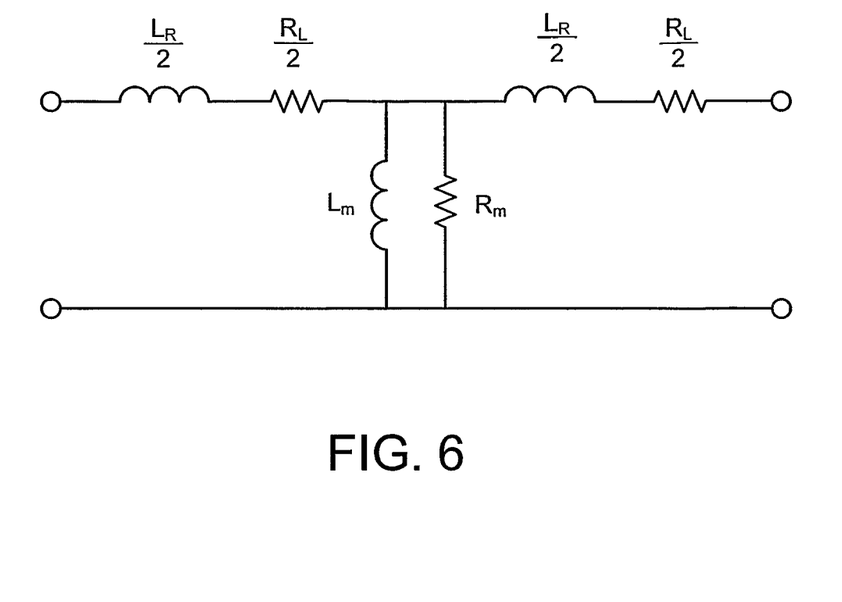
FIG. 6 is a functional schematic of an equivalent circuit of the transformer windings of the distributed series reactor of FIG. 3.

FIG. 6 illustrates an equivalent circuit of the transformer windings. With contact switch 122 closed, the transformer is shorted out and the leakage reactance $L_R$ is inserted in series with the conductor. This leakage reactance is on the order of 0.8 µH, which is negligibly small in this circumstance. The controller 130 monitors line current and cable temperature to optimize thermal capacity. Based on the overall control strategy, the contact switch 122 opens, thus inserting magnetizing inductance $L_m$ into the circuit, when an increase in line inductance is required. With a large number of units in series, a staggered switching technique would need to be used.

Figure 7:
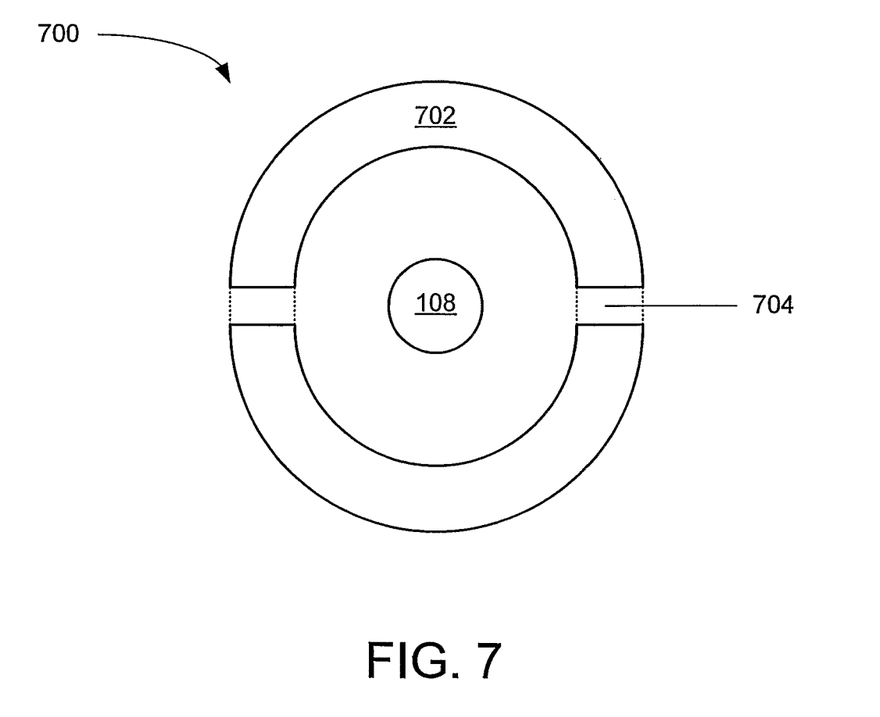
FIG. 7 shows an alternative embodiment distributed series reactor with an adjustable core.

FIG. 7 illustrates an alternative embodiment of a DSR 700 that is purely mechanical. A core that can be moved so that the effective inductance is varied can be used to insert inductance into the conductor 108. A mechanism can be used to hold the two core halves 702 a specific distance apart under normal operating conditions, allowing a minimal inductance to be coupled to the conductor 108. As the temperature of the cable increases, the air gap 704 will be decreased, effectively increasing the inductance. A thermal mechanical band that changes shape with temperature may provide a completely passive implementation of such a device. Alternatively, a solenoid could be used.

Figure 8:
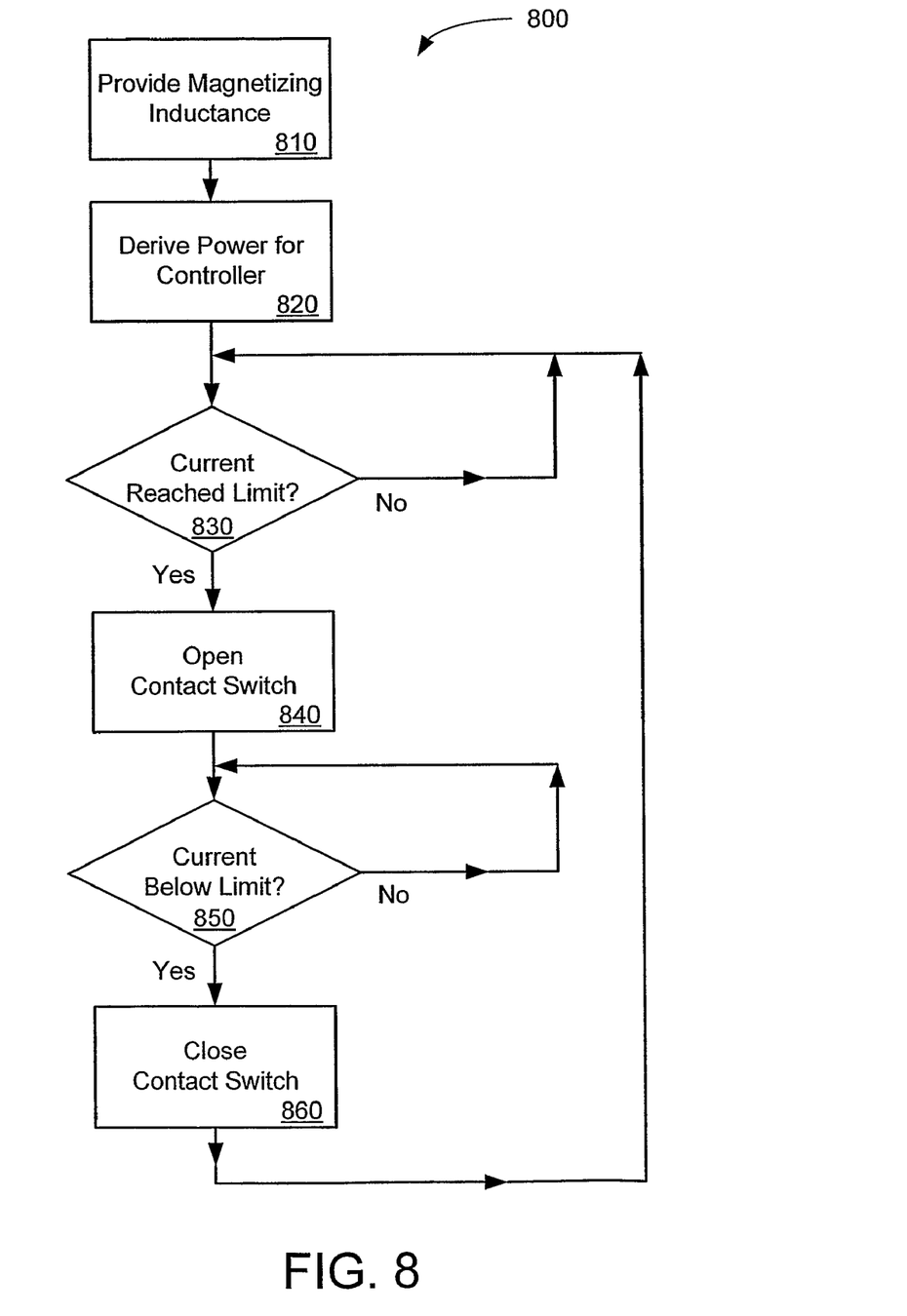
FIG. 8 is a flow chart illustrating the insertion of distributed impedance in a conductor line via the distributed series reactor according to FIG. 3.

FIG. 8 shows a flow chart 800 illustrating the operation of a DSR. A magnetizing inductance is provided in step 810 via a single turn transformer clamped around a conductor where the air gap is designed to provide the magnetizing inductance. Step 820 illustrates derivation of power, used to operate the controller. The power is derived from conductor line current. The line current is monitored in step 830, such that when line current reaches a predetermined value, the contact switch is opened in step 840. Once the contact switch has been opened, then the current is monitored in step 850 until the current drops below the desired value. When the current drops below the desired value, then the contact switch will be closed as illustrated in step 860. As will be understood by those of skill in the art, the method shown in FIG. 8 could comprise more than one STT and typically would. Each of the STTs will then insert magnetizing inductance into the conductor around which it is clamped at a different predetermined value of conductor line current to effect a gradual increase in inductance over the conductor thus reducing the overload and allowing current to increase in the alternative conductors. Again, it should be emphasized that while communications are not required for this method of utilizing the DSR, communications can be used to enhance operations.

Various implementations for inserting distributed series impedance have been simulated. The DSR model assumes a 9.24 kVAR series inductance injection at a current of 770 amperes. Based on experimental STT units built and tested, the leakage inductance is 0.8 µH, while the inserted inductance is 0.042 mH.

Figure 9:
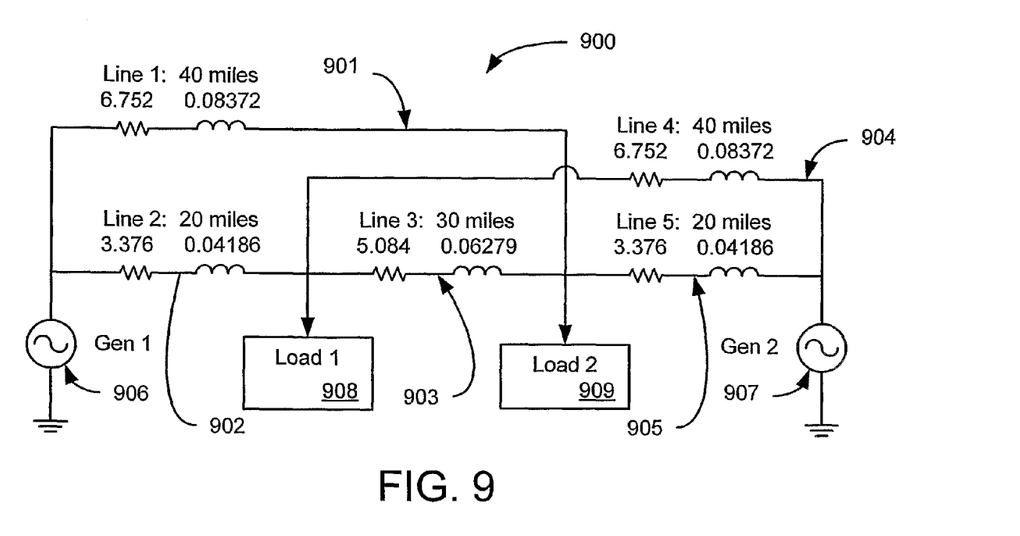
FIG. 9 is a schematic illustrating deployment of the distributed series reactor according to FIG. 3 in a 4-bus power system.
Figure 10:
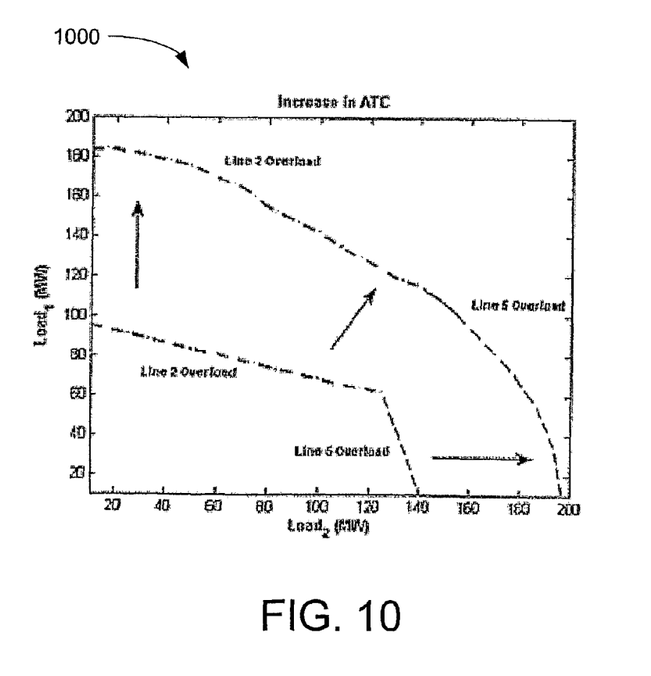
FIG. 10 illustrates the maximum power transferred through the network according to FIG. 9 with the distributed series reactor units bypassed.

The DSR was further used in a four bus system 900, as shown in FIG. 9. FIG. 9 depicts a four bus system 900 having two power sources, Gen 1 denoted by reference numeral 906 and Gen 2 denoted by reference numeral 907. Line 1, denoted by reference numeral 901, has a length of 40 miles and an impedance of 6.752+j0.08372Ω. Line 2, denoted by reference numeral 902, has a length of 20 miles and an impedance of 3.376+j0.04186Ω. Line 32, denoted by reference numeral 903, has a length of 30 miles and an impedance of 5.084+j0.06279Ω. Line 4, denoted by reference numeral 904, has a length of 40 miles and an impedance of 6.752+j0.08372Ω. Line 5, denoted by reference numeral 905, has a length of 20 miles and an impedance of 3.376+j0.04186Ω. Load 1 is denoted by reference numeral 908 and load 2 is denoted by reference numeral 909. When the DSR units are bypassed, the maximum power that can be transferred through the network is limited by Line 2 and Line 5, as shown by graph 1000 in FIG. 10. With additional DSR units, the allowable ATC envelope is seen to be dramatically increased by a minimum of 37.6%.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A system for implementing line overload control via providing distributed series impedance, the system comprising:
   at least one distributed series reactor (DSR) configured to insert a passive inductance into a conductor, the at least one DSR comprising:
      a single turn transformer (STT) including a winding clamped around the conductor, the STT having a magnetizing inductance and a leakage inductance;
      a switching device connected in series with the winding, where the passive inductance is approximately the leakage inductance when the switching device is closed and is approximately the magnetizing inductance when the switching device is open; and
      a controller configured to open the switching device when conductor line current reaches a predetermined value.

2. The system in claim 1, wherein the STT further comprises:
   two split-core sections;
   and
   an air-gap separating the two split-core sections, the air-gap configured such that a specified level of magnetizing inductance is produced when the two split-core sections are clamped around the conductor.

3. The system in claim 1, wherein the switching device includes a contact switch that short circuits the winding when the contact switch is in a closed condition.

4. The system in claim 3, wherein the controller is further configured to insert the magnetizing inductance via opening the contact switch.

5. The system in claim 3, wherein the controller is further configured to allow for insertion of the magnetizing inductance via opening the contact switch.

6. The system in claim 3, wherein the contact switch is normally closed.

7. The system in claim 3, wherein the contact switch is an electromechanical switch.

8. The system in claim 1, wherein the controller is further configured to close the switching device when the conductor line current drops below the predetermined value.

9. The system in claim 5, wherein the controller is further configured to remove the magnetizing inductance when the conductor line current drops below the predetermined value via closing the contact switch.

10. The system in claim 5, wherein the switching device further includes a thyristor in parallel with the contact switch that, when open inserts the magnetizing inductance into the conductor and, when closed removes the magnetizing inductance.

11. The system in claim 1, further comprising a plurality of DSRs, wherein each DSR is configured to insert an amount of magnetizing inductance specific to that DSR.

12. The system in claim 2, wherein the STT further comprises a separate winding for each split-core section.

13. The system in claim 12, wherein the STT further comprises a separate contact switch for each separate winding.

14. The system in claim 1, further comprising at least two conductors.

15. The system in claim 14, wherein each of the at least two conductors is associated with at least one DSR.

16. The system in claim 1, wherein the controller is further configured to send and receive communications for reprogramming the controller.

17. The system in claim 1, wherein the controller is further configured to send and receive communications with controllers associated with other DSRs.

18. The system in claim 1, wherein the controller may be reprogrammed via a short range remote control.

19. A system for implementing line overload control via providing distributed series impedance, the system comprising:
at least one distributed series reactors (DSR) configured to insert a passive inductance into a conductor, each DSR comprising:
a split-core clamped around a conductor, the split-core including an air-gap having a distance corresponding to a predefined magnetizing inductance;
means for determining that a conductor line current has reached a predefined value; and
means for changing the amount of passive inductance inserted into the conductor, wherein the passive inductance is approximately the predefined magnetizing inductance when the predefined value is exceeded.

20. The system in claim 19, wherein the means for changing the amount of passive inductance inserted into the conductor changes the air-gap from an initial distance to the distance corresponding to the predefined magnetizing inductance.

21. The system in claim 19, further comprising means for bypassing the DSR by shorting a winding of the DSR.

22. The system in claim 19, further comprising means for deriving power from conductor line current.

23. The system in claim 19, further comprising means for communicating with the means for changing the amount of passive inductance inserted into the conductor.

24. A method for implementing line overload control via inserting series impedance into a conductor, the method comprising:
inserting a passive inductance into the conductor via a distributed series reactor (DSR); and
causing the passive inductance inserted into the conductor to change to approximately a magnetizing inductance of the DSR when conductor line current reaches a predetermined value.

25. The method of claim 24, wherein the DSR comprises a single turn transformer clamped around the conductor wherein an air gap is configured to provide the magnetizing inductance.

26. The method of claim 24, further comprising deriving power for a controller from conductor line current.

27. The method of claim 24, further comprising opening a contact switch to allow the passive inductance to change when conductor line current reaches the predetermined value.

28. The method of claim 27, wherein opening the contact switch causes the passive inductance to change.

29. The method of claim 27, further comprising closing the contact switch when conductor line current drops below the predetermined value.

30. The method of claim 29, wherein closing the contact switch changes the passive inductance to approximately a leakage inductance of the DSR.

31. The method of claim 24, further providing passive inductance via at least two DSRs.

32. The method of claim 31, wherein each of the at least two DSRs is configured to change the passive inductance to a predetermined magnetizing inductance specific to that DSR, the predefined magnetizing inductance defined by an air-gap distance of that DSR.

33. The method of claim 24, further comprising inserting passive inductance into at least two conductors, each of the at least two conductors being associated with at least one corresponding DSR.

34. The method of claim 24, further comprising communicating programming information to a controller of the DSR.

35. The method of claim 24, further comprising communicating from one DSR to another DSR.

* * * * *

UNITED STATES PATENT AND TRADEMARK OFFICE
CERTIFICATE OF CORRECTION

| | | |
|---|---|---|
| PATENT NO. | : 7,835,128 B2 | Page 1 of 1 |
| APPLICATION NO. | : 11/815052 | |
| DATED | : November 16, 2010 | |
| INVENTOR(S) | : Divan et al. | |

It is certified that error appears in the above-identified patent and that said Letters Patent is hereby corrected as shown below:

a) Column 3, line 30: add "a" after the word "is"

b) Column 3, line 31: add "the" after the word "as"

c) Column 3, line 31: delete "according to" and replace with "of"

d) Column 3, line 31: delete "in" after the word "switch"

e) Column 3, line 32: add "an" after the word "to"

f) Column 4, line 52: add "103" after the word "system"

g) Column 10, line 55: add "a" after the word "when"

h) Column 11, line 33: add "the" after the word "with"

i) Column 11, line 48: delete "a" after the word "around" and replace with "the"

j) Column 12, line 9: add "the" after the word "from"

k) Column 12, line 21: add "a" after the word "when"

l) Column 12, line 28: add "the" after the word "from"

m) Column 12, line 31: add "the" after the word "when"

n) Column 12, line 35: add "the" after the word "when"

Signed and Sealed this
Twenty-ninth Day of November, 2011

David J. Kappos
*Director of the United States Patent and Trademark Office*